(12) United States Patent
Wakisaka et al.

(10) Patent No.: US 10,381,003 B2
(45) Date of Patent: Aug. 13, 2019

(54) VOICE ACQUISITION SYSTEM AND VOICE ACQUISITION METHOD

(71) Applicant: TOYOTA JIDOSHA KABUSHIKI KAISHA, Toyota-shi, Aichi-ken (JP)

(72) Inventors: Youhei Wakisaka, Tokyo (JP); Hitoshi Yamada, Nagakute (JP); Tomoya Takatani, Nisshin (JP); Narimasa Watanabe, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 15/704,681

(22) Filed: Sep. 14, 2017

(65) Prior Publication Data
US 2018/0082686 A1 Mar. 22, 2018

(30) Foreign Application Priority Data
Sep. 21, 2016 (JP) .................................. 2016-184189

(51) Int. Cl.
| | |
|---|---|
| G10L 15/22 | (2006.01) |
| B25J 11/00 | (2006.01) |
| G05D 1/02 | (2006.01) |
| B25J 13/00 | (2006.01) |
| H04R 3/00 | (2006.01) |

(Continued)

(52) U.S. Cl.
CPC ........... *G10L 15/22* (2013.01); *B25J 11/0005* (2013.01); *B25J 13/003* (2013.01); *G05D 1/0255* (2013.01); *H04R 3/005* (2013.01); *G10L 15/30* (2013.01); *G10L 21/0272* (2013.01);

(Continued)

(58) Field of Classification Search
None
See application file for complete search history.

(56) References Cited

U.S. PATENT DOCUMENTS

2011/0164141 A1* 7/2011 Tico ................... G10L 21/0208
348/207.99
2014/0136203 A1* 5/2014 Liu ....................... H04R 3/005
704/246

(Continued)

FOREIGN PATENT DOCUMENTS

JP 2014-219467 A 11/2014

OTHER PUBLICATIONS

Sekiguchi et al.; Optimizing the Layout of Multiple Mobile Robots for Cooperative Sound Source Separation; IEEE/RSJ International Conference on Intelligent Robots and Systems (IROS) Congress Center Hamburg, Sep. 28-Oct. 2, 2015, Hamburg, Germany; pp. 5548-5554. (Year: 2015).*

*Primary Examiner* — Abul K Azad
(74) *Attorney, Agent, or Firm* — Oliff PLC

(57) ABSTRACT

A voice acquisition system includes a plurality of mobile objects each of which includes one or more microphones and is movable around a sound source; a sound source number estimating unit which estimates the number of sound sources in a vicinity of any of the mobile objects; and a control unit which controls positions of the mobile objects, wherein the control unit controls, based on the number of sound sources in a vicinity of a first mobile object, a position of a second mobile object which differs from the first mobile object, and the voice acquisition system acquires voice using both a microphone included in the first mobile object and a microphone included in the second mobile object.

7 Claims, 8 Drawing Sheets

(51) Int. Cl.
*G10L 15/30* (2013.01)
*G10L 21/0272* (2013.01)
*H04R 1/02* (2006.01)

(52) U.S. Cl.
CPC ........ *G10L 2015/223* (2013.01); *H04R 1/028* (2013.01); *H04S 2400/15* (2013.01)

(56) References Cited

U.S. PATENT DOCUMENTS

2014/0168352 A1* 6/2014 Verthein .................. H04N 7/15
 348/14.08
2014/0328487 A1 11/2014 Hiroe

* cited by examiner

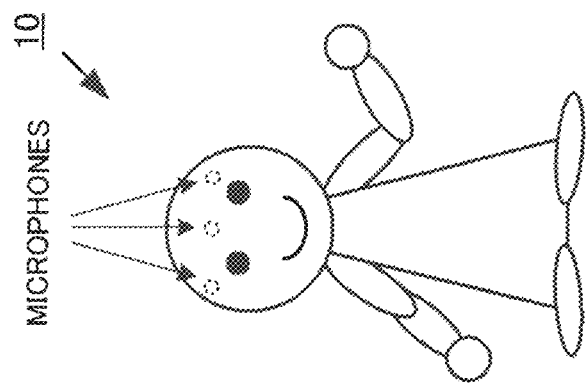
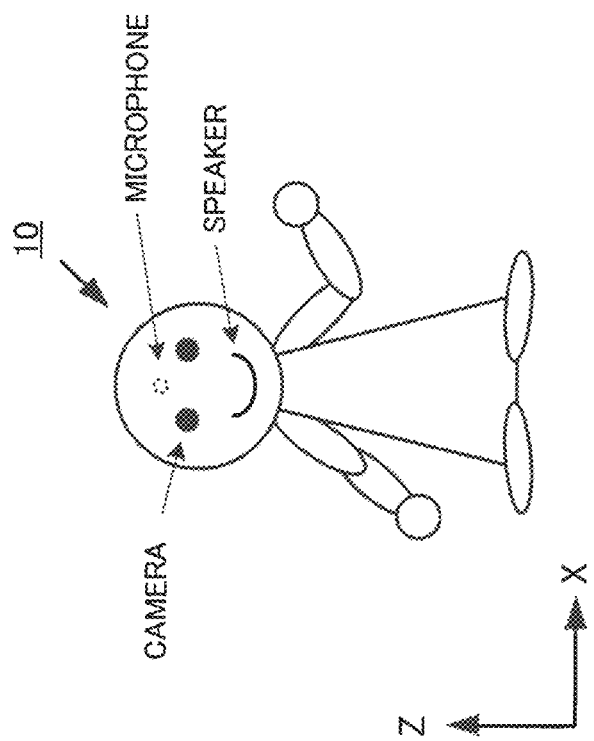
FIG. 2A
FIG. 2B

ASSISTANCE REQUEST

| ID OF OWN ROBOT | NUMBER OF DETECTED PERSONS | NUMBER OF NECESSARY ASSISTANCE (NUMBER OF MICROPHONES) | TARGET POSITIONAL INFORMATION |
|---|---|---|---|
| R001 | 2 | 1 | ... |

FIG. 6A

ASSISTANCE REQUEST

| ID OF MICROPHONE TO BE MOVED | TARGET POSITIONAL INFORMATION |
|---|---|
| M001 | ... |

FIG. 6B

VOICE ACQUISITION SYSTEM AND VOICE ACQUISITION METHOD

BACKGROUND OF THE INVENTION

Field of the Invention

The present invention relates to a technique for acquiring voice using a microphone mounted to a mobile object.

Description of the Related Art

In recent years, robots which provide various kinds of information by interacting with a person using voice are being developed. Many of such interactive robots are based on the assumption that the interaction with persons are to be performed one-on-one and are generally not-good at interacting with a plurality of persons at the same time. Reasons for this include an incapability of distinguishing one voice-emitting partner from another.

Inventions that attempt to solve this problem include the invention described in Japanese Patent Application Laid-open No. 2014-219467. This invention involves first acquiring voices using a plurality of microphones and then extracting only sound emitted from an object sound source. Applying such a technique to an interactive robot enables voices respectively uttered by a plurality of interaction partners to be individually identified.

SUMMARY OF THE INVENTION

However, with the technique described in Japanese Patent Application Laid-open No. 2014-219467, since an object voice is extracted using a plurality of microphones, when the number of sound sources that are identification targets exceed the number of microphones, there is a risk that position detection accuracy with respect to sound sources may decline and the object voice cannot be correctly extracted. In other words, there is a problem that accuracy declines when attempting to interact with a larger number of persons than the number of persons determined at the time of design.

The present invention has been made in consideration of the problem described above and an object thereof is to provide a voice acquisition system which accurately separates a sound emitted from a sound source.

The present invention in its one aspect provides a voice acquisition system, comprising a plurality of mobile objects each of which includes one or more microphones and is movable around a sound source; a sound source number estimating unit which estimates the number of sound sources in a vicinity of any of the mobile objects; and a control unit which controls positions of the mobile objects, wherein the control unit controls, based on the number of sound sources in a vicinity of a first mobile object, a position of a second mobile object which differs from the first mobile object, and the voice acquisition system acquires voice using both a microphone included in the first mobile object and a microphone included in the second mobile object.

The mobile object according to the present invention is characteristically movable around a sound source in an autonomous manner. The mobile object may be a communication robot or the like or may be a microphone itself. In addition, while the sound source is typically a human being, the sound source may also be a robot. The mobile object has a function for acquiring voice with a microphone.

The sound source number estimating unit is a unit which estimates the number of sound sources in the vicinity of the mobile object. The sound source number estimating unit estimates the number of sound sources using, for example, means such as a camera or a sensor.

When a large number of sound sources concentrate in the vicinity of a first mobile object, inconveniences such as "being unable to separate voices emitted from a plurality of sound sources" and "being unable to perform processing for suppressing voice emitted from a sound source other than a targeted sound source" may arise with a limited number of microphones mounted to the first mobile object.

In consideration thereof, after controlling a position of a second mobile object based on the number of sound sources in the vicinity of the first mobile object, the control unit acquires voice using microphones included in both the first mobile object and the second mobile object. According to this configuration, the number of microphones necessary for acquiring voice from a plurality of sound sources can be secured.

Moreover, the sound source number estimating unit and the control unit may be provided independent of a mobile object or may be incorporated into a mobile object. When the control unit is incorporated into a mobile object, the control unit included in the first mobile object controls a position of the second mobile object by transmitting a request to the control unit included in the second mobile object.

The voice acquisition system may separate sound emitted from a plurality of sound sources according to the sound source using both the microphone included in the first mobile object and the microphone included in the second mobile object.

The present invention can be preferably applied to a system which separates and processes sounds emitted from a plurality of sound sources. "Separation" may involve extracting only voice emitted from an object sound source or suppressing voice emitted from a sound source other than the object sound source.

The separation of voice may be performed by, for example, simply bringing a single mobile object close to a single sound source or acquiring a voice signal using a plurality of microphones included in a plurality of mobile objects and computing the signal. Alternatively, a statistical approach may be used to perform voice separation.

When the number of sound sources present in a vicinity of the first mobile object as estimated by the sound source number estimating unit is larger than a prescribed number, the control unit may move the second mobile object to a vicinity of the first mobile object.

Also, the prescribed number may be a number of a plurality of sound sources which are present in a vicinity of the first mobile object and which emit sound that cannot be separated at a prescribed accuracy by the number of microphones mounted to the first mobile object.

When the number of sound sources present in the vicinity of the first mobile object is larger than a prescribed number, accuracy when separating voice emitted from a sound source may decline. In consideration thereof, the second mobile object is brought close to the first mobile object. Accordingly, a necessary number of microphones can be secured to ensure accuracy of voice separation.

The control unit may determine whether or not sound emitted by the plurality of sound sources can be separated at the prescribed accuracy based on information related to the number or an arrangement of the microphones mounted to the first mobile object.

An accuracy at which sound emitted from a sound source is separated varies depending on the number and an arrangement of microphones. For example, when a plurality of microphones are arranged at a same height, a height of a sound source cannot be estimated. Therefore, a configuration may be adopted in which whether or not prescribed accuracy can be attained is determined based on information on the number or an arrangement of the microphones.

The prescribed number may be a number larger than the number of microphones mounted to the first mobile object.

This is because, generally, when the number of sound sources exceeds the number of microphones, accuracy when identifying a position of a sound source declines.

The present invention in its another aspect provides a mobile object which includes one or more microphones and which is movable around a sound source, the mobile object comprising a sound source number estimating unit which estimates the number of sound sources in a vicinity of the mobile object; a control unit which controls, based on the number of sound sources in a vicinity of the mobile object, a position of another mobile object; and a voice acquisition unit which acquires voice using both a microphone included in the mobile object itself and a microphone included in the other mobile object.

Moreover, the present invention can be identified as a voice acquisition system or a mobile object which includes at least a part of the units described above. In addition, the present invention can also be identified as a voice acquisition method carried out by the voice acquisition system or the mobile object. The processes and units described above may be implemented in any combination thereof insofar as technical contradictions do not occur.

According to the present invention, a voice acquisition system which accurately separates a sound emitted from a sound source can be provided.

BRIEF DESCRIPTION OF THE DRAWINGS

FIGS. 2A and 2B are external views of a robot 10;

FIGS. 6A and 6B are diagrams illustrating an assistance request that is transmitted to another robot;

DESCRIPTION OF THE EMBODIMENTS

First Embodiment

Hereinafter, a preferred embodiment of the present invention will be described with reference to the drawings.

A voice interaction system according to the present embodiment is a system which is constituted by a plurality of robots and two servers and in which the robots interact with a user in a natural language by communicating with the servers.

<System Configuration>

Figure 1:
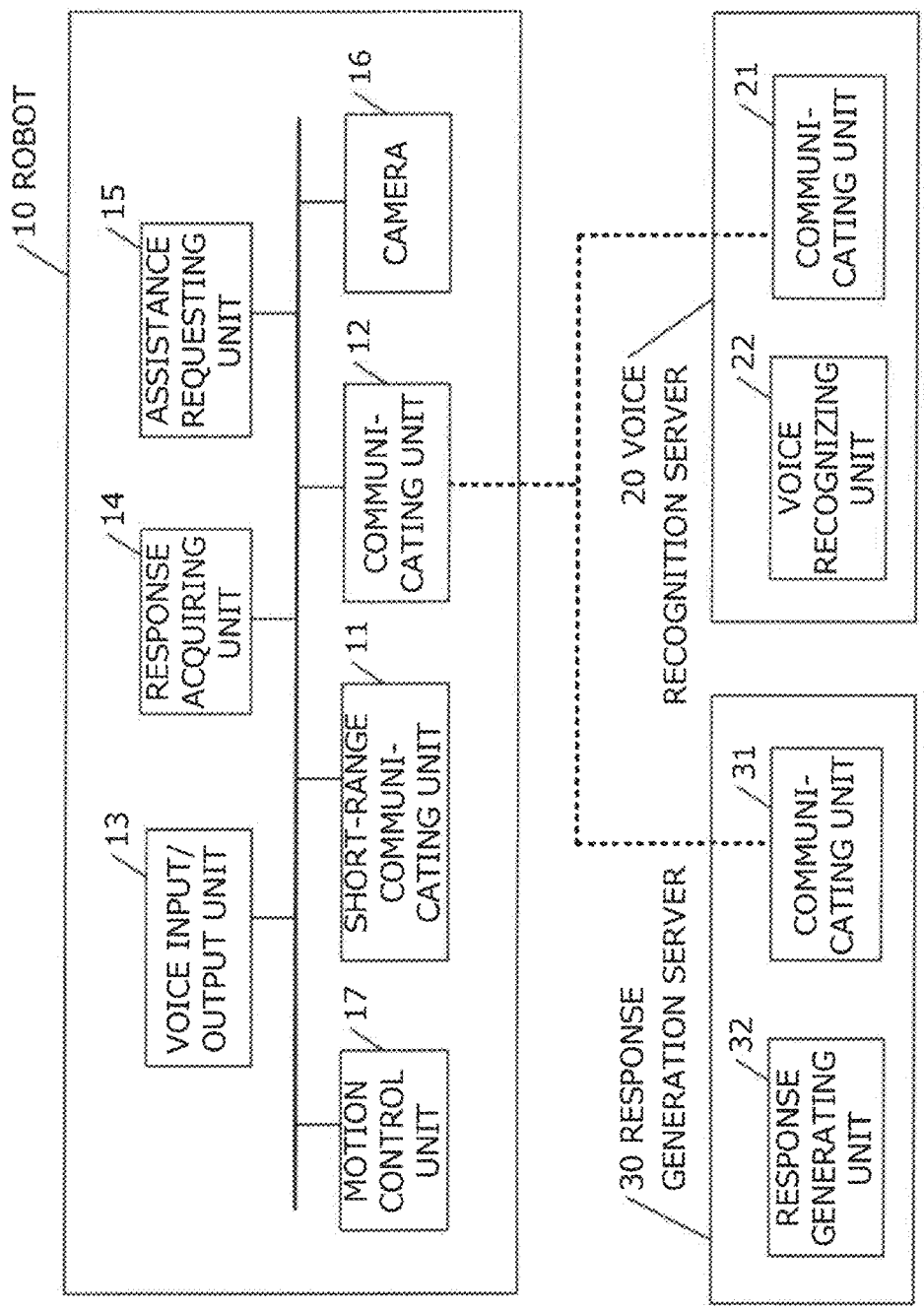
FIG. 1 is a system configuration diagram of a voice interaction system according to a first embodiment.

FIG. 1 is a system configuration diagram of a voice interaction system according to the present embodiment. The voice interaction system according to the present embodiment is configured so as to include a robot 10, a voice recognition server 20, and a response generation server 30. Moreover, although not shown in FIG. 1, the voice interaction system according to the present embodiment can be configured so as to include a plurality of robots 10.

First, the robot 10 will be described.

The robot 10 has a function for acquiring voice from the outside, a function for acquiring, based on a result of recognizing the voice, a sentence (hereinafter, a response sentence) to serve as a response to the input voice, and a function for outputting the response sentence by voice. While an example of the robot 10 is a communication robot, the robot 10 need not necessarily have a semblance of a character. For example, a general-purpose computer that can be built into a robot may suffice. The present embodiment will be described using, as an example, a mode in which a plurality of movable robots 10 are arranged on a field and are capable of interacting with an arbitrary user.

The robot 10 is configured so as to include a short-range communicating unit 11, a communicating unit 12, a voice input/output unit 13, a response acquiring unit 14, an assistance requesting unit 15, a camera 16, and a motion control unit 17.

The short-range communicating unit 11 is a unit used to communicate in a wireless manner between robots 10. In the first embodiment, the short-range communicating unit 11 communicates using a Bluetooth (registered trademark) connection. In the first embodiment, information exchange among a plurality of robots 10 is realized using the short-range communicating unit 11.

The communicating unit 12 is a unit which communicates with the voice recognition server 20 and the response generation server 30 to be described later by accessing a network via a communication line (for example, a wireless LAN).

The voice input/output unit 13 is a unit used to input and output voice. Specifically, voice is converted into an electrical signal (hereinafter, voice data) using a single built-in microphone such as that shown in FIG. 2A. The acquired voice data is transmitted to the voice recognition server 20 to be subjected to a voice recognition process.

In addition, using a built-in speaker, the voice input/output unit 13 converts voice data transmitted from the response acquiring unit 14 to be described later into voice.

The response acquiring unit 14 is a unit which, using the response generation server 30, acquires a response sentence with respect to an input voice and converts the response sentence into voice data. Specifically, the response acquiring unit 14 executes a process of transmitting a text transmitted from the voice recognition server 20 (a text obtained as a result of voice recognition) to the response generation server 30 and acquiring a response sentence and a process of converting the response sentence into voice data by voice synthesis.

The assistance requesting unit 15 is a unit which determines that a plurality of sound sources are present in the vicinity of its own robot and which requests assistance to other robots 10.

Figure 3:
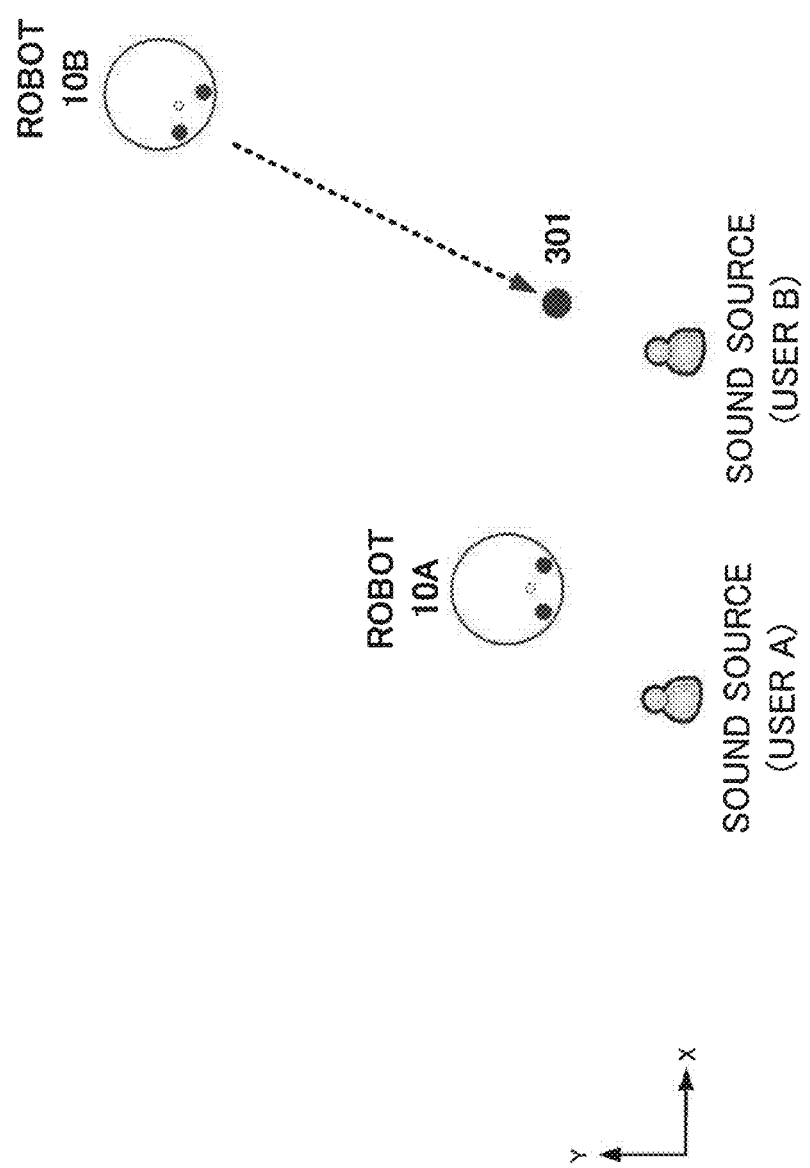
FIG. 3 is a diagram illustrating an assistance request to another robot.

A description thereof will now be given with reference to FIG. 3. The robot 10 according to the present embodiment is not equipped with a function for separating voices arriving from a plurality of sound sources. For example, as shown in FIG. 3, when a user A and a user B are present in the vicinity of a robot 10A, voices uttered by the respective users cannot be distinguished from one another.

In consideration thereof, in the present embodiment, the robot 10 (the assistance requesting unit 15) photographs a periphery of its own robot using the camera 16, determines the number of sound sources (in other words, the number of users), and when the number of sound sources is equal to or larger than two, requests assistance to other robots 10 by short-range wireless communication. Accordingly, other robots 10 are brought close in order to acquire voice through cooperation.

For example, let us assume that the robot 10A has requested a robot 10B to "move to the vicinity of the user B to acquire voice uttered by the user B". Accordingly, in response thereto, the robot 10B moves to a position indicated by reference numeral 301, acquires voice, and transmits the acquired voice data to the robot 10A. In other words, role-sharing is carried out in which the robot 10A acquires voice from the user A and the robot 10B acquires voice from the user B.

Each robot acquires voice with a microphone gain of a level which enables an utterance of a user present in the immediate vicinity of the robot to be mainly acquired. Moreover, the robot 10A handles voice data acquired by itself as the voice of the user A and voice data acquired from the robot 10B as the voice of the user B and generates respective response sentences thereto.

The camera 16 is a camera which captures images of a periphery of the robot 10 and which acquires a visible light image. In the present embodiment, the assistance requesting unit 15 detects human faces from an acquired image and, based on the number of detected faces, determines the number of users present around the robot 10. Moreover, while a camera is exemplified in the present embodiment, other means (such as a sensor) may be used as long as the number of users present around the robot 10 can be determined.

The motion control unit 17 is a unit which performs control for moving the robot 10. Specifically, the robot is moved on an X-Y plane using a driving unit (not shown). Accordingly, the robot 10 can move to an arbitrary position on the field.

The voice recognition server 20 is a server apparatus specialized for voice recognition and is constituted by a communicating unit 21 and a voice recognizing unit 22.

Since functions of the communicating unit 21 are similar to those of the communicating unit 12 described earlier, a detailed description thereof will be omitted.

The voice recognizing unit 22 is a unit which performs voice recognition on acquired voice data and which converts the voice data into a text. Voice recognition can be performed using known techniques. For example, the voice recognizing unit 22 stores acoustic models and a recognition dictionary and performs voice recognition by comparing acquired voice data with an acoustic model to extract a feature and matching the extracted feature with the recognition dictionary. The text obtained as a result of the voice recognition is transmitted to the response generation server 30 via the response acquiring unit 14.

The response generation server 30 is a server apparatus specialized for generation of a response sentence and is constituted by a communicating unit 31 and a response generating unit 32.

Since functions of the communicating unit 31 are similar to those of the communicating unit 12 described earlier, a detailed description thereof will be omitted.

The response generating unit 32 is a unit which generates a sentence (a response sentence) to serve as a response based on a text generated by the voice recognition server 20 (in other words, contents of an utterance made by a user). For example, the response generating unit 32 may generate a response sentence based on an interaction scenario (an interaction dictionary) stored in advance. The response sentence generated by the response generating unit 32 is transmitted in a text format to the response acquiring unit 14 and subsequently output toward a user by a synthesized voice.

Each of the voice recognition server 20 and the response generation server 30 can be configured as an information processing apparatus including a CPU, a main storage apparatus, and an auxiliary storage apparatus. The respective units illustrated in FIG. 1 function as a result of a program stored in the auxiliary storage apparatus being loaded on the main storage apparatus and executed by the CPU. Alternatively, all of or a part of the illustrated functions may be executed using exclusively designed circuits.

<Processing Flow Chart>

Figure 4:
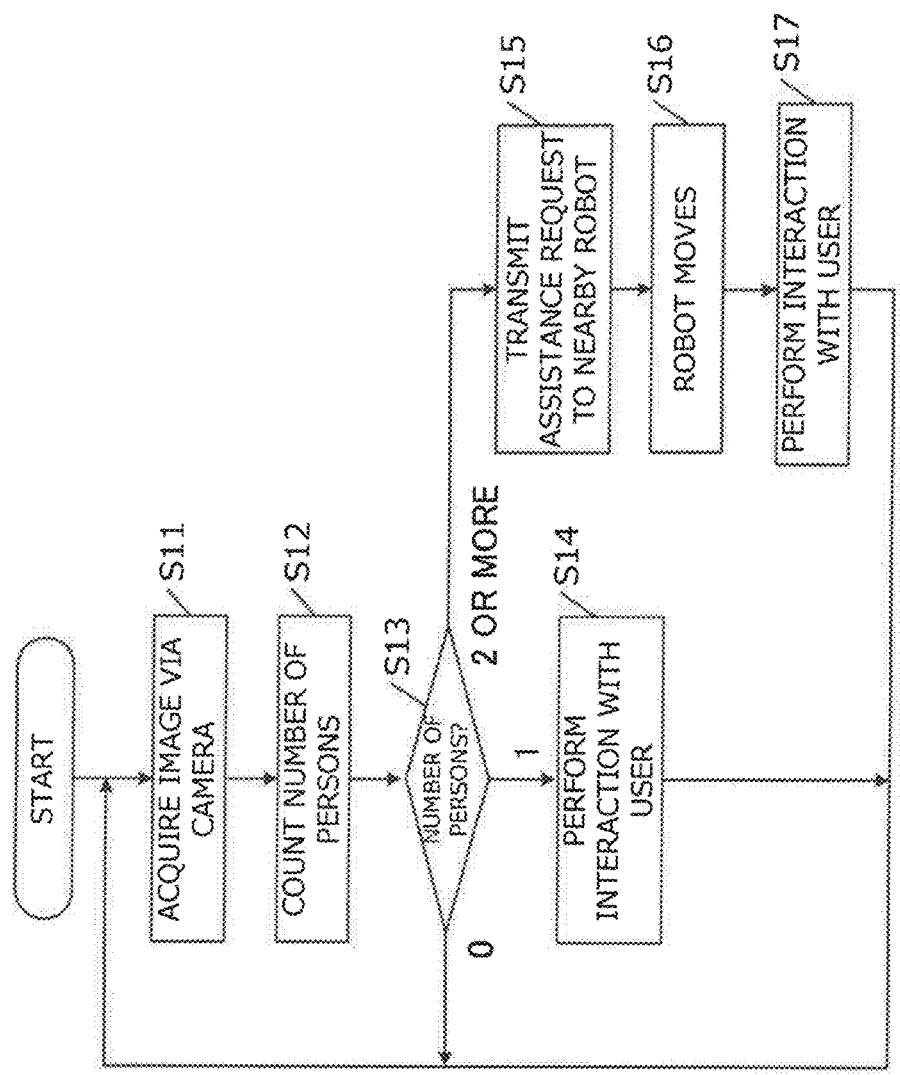
FIG. 4 is a flow chart of processes executed by a robot in the first embodiment.

Next, specific contents of processes performed by the robot 10 will be described. FIG. 4 is a flow chart showing processes executed by the robot 10.

First, in step S11, the assistance requesting unit 15 acquires an image via the camera 16. While an image of which an imaging range is limited to the front of the robot is acquired in the present embodiment, other imaging ranges may be adopted instead.

Next, in step S12, based on the acquired image, the assistance requesting unit 15 counts the number of persons in front of its own robot. For example, a process of detecting human faces from the acquired image is performed, in which case the number of persons is determined based on the obtained number of faces.

Next, in step S13, the number of counted persons is determined. As a result, when the number of counted persons is zero (in other words, when nobody is present in the image), the process returns to step S11.

When the number of counter persons is one, a transition is made to step S14 to perform interaction with the user.

Figure 5:
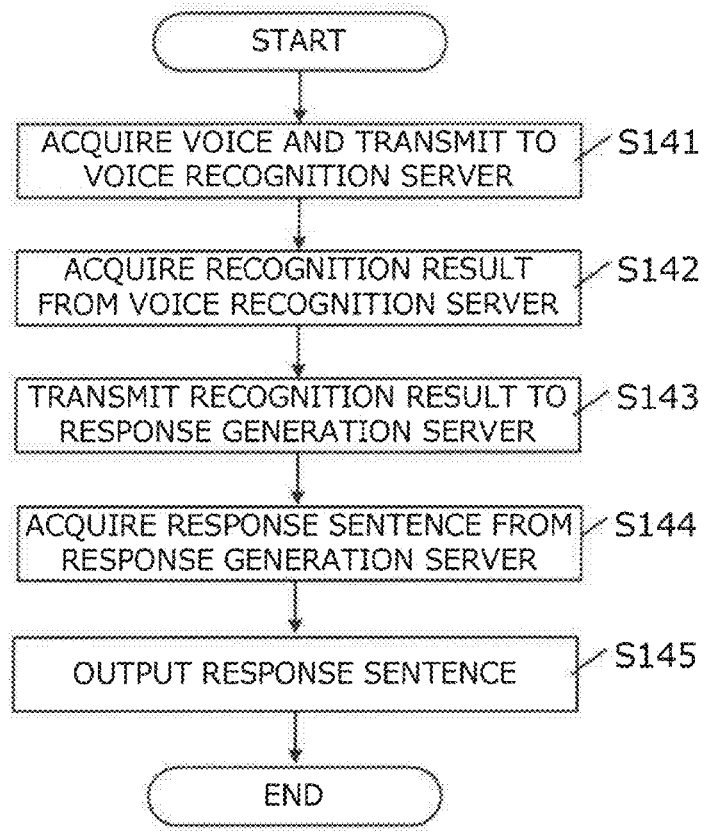
FIG. 5 is a flow chart of processes executed by a robot in the first embodiment.

The process performed in step S14 will now be described in detail. FIG. 5 is a flow chart showing the process performed in step S14 in detail.

First, in step S141, the voice input/output unit 13 acquires voice from a user who is an interaction partner through a microphone. The acquired voice is converted into voice data and transmitted to the voice recognition server 20 via the communicating unit 12 and the communicating unit 21. Moreover, in doing so, the robot 10 may be moved close to the user who is the interaction partner. For example, the motion control unit 17 may recognize a position of the user based on the image acquired in step S11 and perform a control of moving the robot to the vicinity of the user.

The voice data transmitted to the voice recognition server 20 is converted into a text by the voice recognizing unit 22 and, once the conversion is complete, transmitted to the response acquiring unit 14 via the communicating unit 21 and the communicating unit 12 (step S142).

Next, in step S143, the response acquiring unit 14 transmits, to the response generation server 30, the text transmitted from the voice recognition server 20. Subsequently, the response generating unit 32 generates a response sentence based on the transmitted text and transmits the generated response sentence to the response acquiring unit 14 (step S144). Finally, the response acquiring unit 14 converts the response sentence into voice data by voice synthesis, and outputs the voice data via the voice input/output unit 13 (step S145).

Next, a case where the number of persons counted in step S13 is two or more will be described. When the number of counted persons is two or more, voices respectively uttered by the persons can no longer be separated by a single robot. In this case, the assistance requesting unit 15 transmits an assistance request to other robots 10 present nearby via the short-range communicating unit 11 (step S15). FIG. 6A is a diagram showing an example of contents of the assistance request transmitted by short-range wireless communication. In the present embodiment, an ID (identifier) of a robot, the number of detected persons, the number of necessary assistance (the number of necessary microphones), and positional information of a target sound source are transmitted to nearby robots.

Moreover, the target positional information is used as information representing a movement destination of a robot having received the assistance request. For example, the target positional information may be generated based on positional information of the robot having transmitted the assistance request and the image acquired in step S11 or generated based on a position of a sound source specified by other means.

The assistance request transmitted in step S15 is received by other robots. When there are a plurality of other robots having received the assistance request, the plurality of robots consult with each other to select robots corresponding to the number indicated in "the number of necessary assistance". For example, the robots to provide assistance may be selected in a descending order of proximity to the sound source that is the target.

Subsequently, the selected robots move in accordance with the target positional information (step S16). In the example shown in FIG. 3, the robot 10B moves to a point 301 which is in the vicinity of the user B.

Next, in step S17, an interaction with the user is performed in a similar manner to step S14. While the process in step S17 is similar to the process shown in FIG. 5, a difference is that voice data acquired by the robot providing assistance (in the present example, the robot 10B) is transmitted to the robot receiving the assistance (in the present example, the robot 10A). Another difference is that, based on the received voice data, the robot receiving the assistance performs interaction processes in parallel for each user. In other words, the process shown in FIG. 5 is executed for each of the users (in the present example, the user A and the user B) who are to be interacted with.

Moreover, when the number of microphones is still insufficient even after executing step S16, a transition to step S15 may be performed once again to once again generate and transmit an assistance request.

As described above, with the voice interaction system according to the first embodiment, when the number of microphones mounted to a robot is insufficient and voices uttered by a plurality of users cannot be separated from each other, assistance is requested to another robot and interaction is performed by additionally using a microphone included in the other robot. According to this configuration, a robot having a single microphone becomes capable of interacting with two or more users at the same time.

Second Embodiment

In the first embodiment, each robot has a single microphone and a sound source is separated by having a single robot approach a single user. In contrast, the second embodiment represents an embodiment in which each robot has a plurality of microphones.

Figure 7:
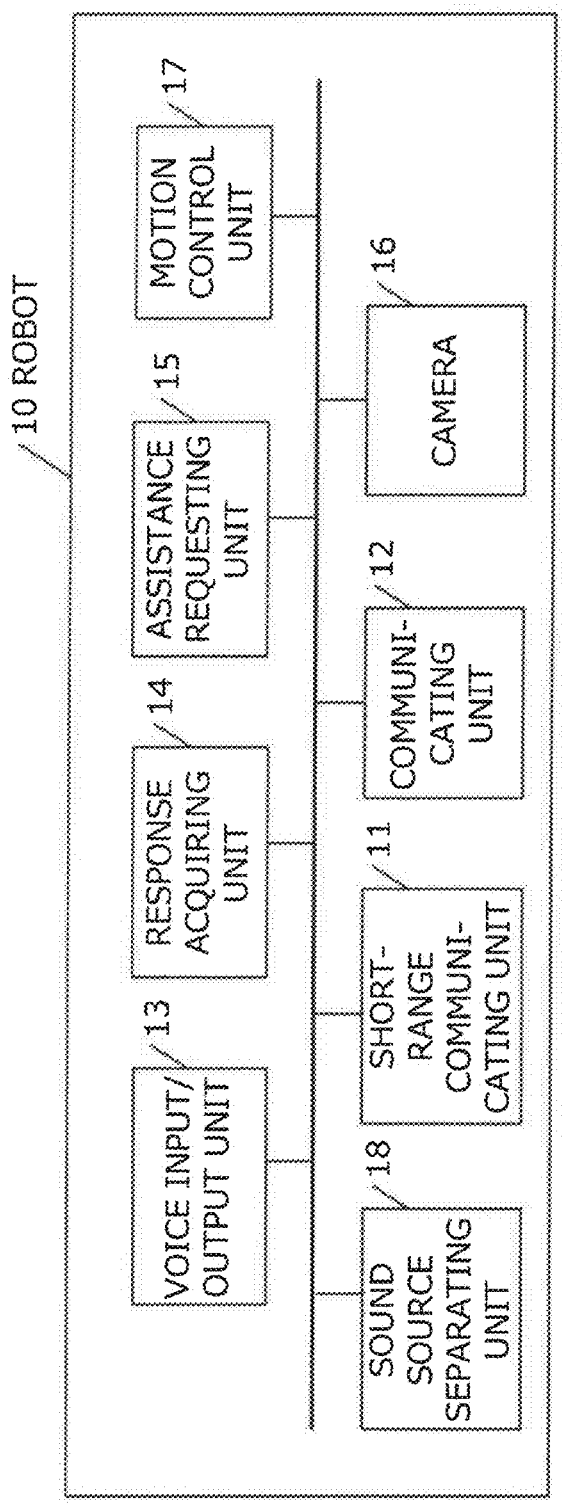
FIG. 7 is a system configuration diagram of a robot according to a second embodiment.

FIG. 7 is a system configuration diagram of the robot 10 according to the second embodiment. The robot 10 according to the second embodiment differs from the robot 10 according to the first embodiment in that the robot 10 according to the second embodiment includes a sound source separating unit 18.

Another difference from the robot 10 according to the first embodiment is that the voice input/output unit 13 includes a microphone array (depicted by a dotted line) such as that shown in FIG. 2B and is capable of acquiring voice data with each microphone.

The sound source separating unit 18 is a unit which extracts voices respectively uttered by a plurality of users that are interaction partners from voice acquired by the voice input/output unit 13 (in other words, multi-channel voice acquired by the microphone array).

The sound source separating unit 18 analyzes a signal obtained from the microphone array included in the voice input/output unit 13, estimates a position of a user relative to the robot, and extracts only voice arriving from the position. By first recording and then computing signals obtained from the respective microphones, a direction and a distance of a sound source can be calculated. In addition, by suppressing voice arriving from sound sources other than the object sound source, only voice uttered by the targeted user can be extracted.

Since a method of estimating a sound source position using a microphone array and a method of extracting only voice arriving from a sound source at a specific position (suppressing voice arriving from sound sources other than the sound source at the specific position) are well known, a detailed description thereof will be omitted herein.

Moreover, the microphones may be arranged two-dimensionally or three-dimensionally. A three-dimensional arrangement enables a position in a height (Z axis) direction to be detected.

In the second embodiment, since a single robot 10 has three microphones, a position of a sound source on a plane can be estimated. In addition, based on the estimated position, a sound source can be separated. However, when the number of sound sources increases, accuracy of estimating a position of a sound source may decline and voice separation accuracy may also decline.

To address this issue, in the second embodiment, the assistance requesting unit 15 included in the robot 10 determines that the number of microphones for attaining prescribed accuracy is insufficient and performs an assistance request to other robots. Moreover, whether or not the prescribed accuracy can be attained may be determined based on information related to an arrangement of a plurality of microphones included in the robot of the assistance requesting unit 15.

Even in the second embodiment, voice data is transmitted from a robot providing assistance to a robot receiving the assistance in a similar manner to the first embodiment. In addition, the robot receiving the assistance performs processes of estimating a sound source position and separating voice by further using the received voice data.

Moreover, while the assistance request transmitted in the second embodiment may be the assistance request shown in FIG. 6A, information related to microphones included in the robot transmitting the assistance request may be further added. For example, the assistance request may include the number of microphones included in the robot transmitting the assistance request, mounting angles of the microphones, and heights of the microphones to have other robots receiving the assistance request determine a feasibility of assistance (whether or not the robot transmitting the assistance request can be assisted to realize prescribed accuracy).

Third Embodiment

In the first and second embodiments, the robot 10 arranged on a field interacts with a user. In contrast, the third embodiment represents an embodiment in which a fixed interactive apparatus 40 interacts with a user using a plurality of microphones which move on a field.

Figure 8:
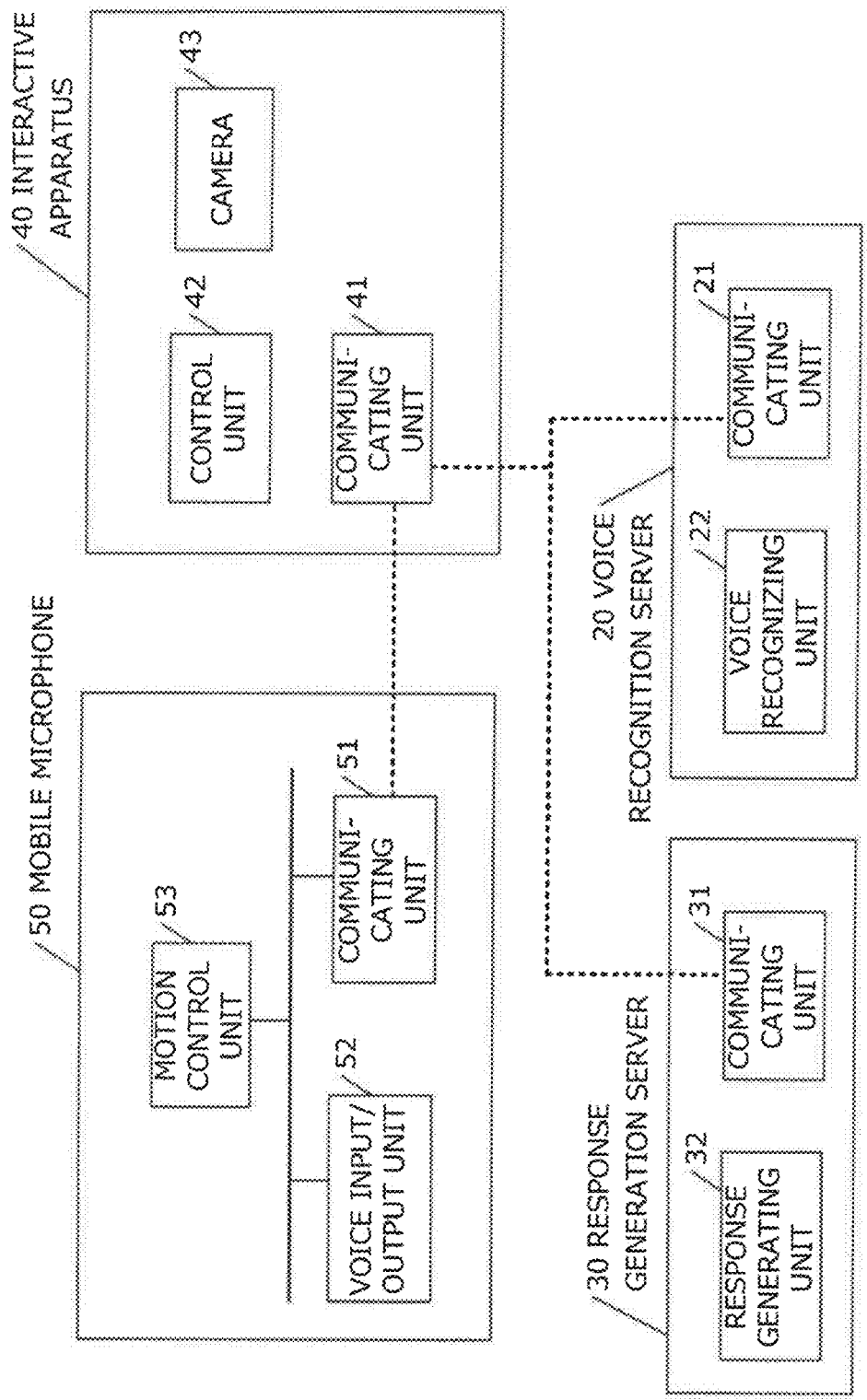
FIG. 8 is a system configuration diagram of a voice interaction system according to a third embodiment.

FIG. 8 is a configuration diagram of a voice interaction system according to the third embodiment.

A mobile microphone 50 is a microphone apparatus created by omitting the function for autonomous movement from the robot 10 according to the first embodiment and includes a communicating unit 51, a voice input/output unit 52, and a motion control unit 53.

The communicating unit 51 is a unit having a similar function to the communicating unit 12 described earlier. In addition, the voice input/output unit 52 is a unit having a similar function to the voice input/output unit 13 described earlier. Furthermore, the motion control unit 53 is a unit having a similar function to the motion control unit 17 described earlier.

The interactive apparatus 40 is a server apparatus constituted by a communicating unit 41, a control unit 42, and a camera 43. The interactive apparatus 40 can also be configured as an information processing apparatus including a CPU, a main storage apparatus, and an auxiliary storage apparatus.

Since functions of the communicating unit 41 are similar to those of the communicating unit 12 described earlier, a detailed description thereof will be omitted.

The control unit 42 is a unit having a function for acquiring voice data from the mobile microphone 50 via a network and interacting with a user using the acquired voice data. In addition, the control unit 42 has a function for controlling a position of the mobile microphone 50. Details of the process will be provided later.

The camera 43 is a camera which is installed at a position providing a downward perspective of a field and which acquires a visible light image. Moreover, while a camera is exemplified in the present embodiment, means such as a sensor may be used instead as long as the number and positions of users can be determined.

In the third embodiment, the control unit 42 acquires an image via the camera 43, determines the number of users based on the image, and then determines whether or not there are enough microphones to separate a sound source with sufficient accuracy. As a result, when it is determined that the sound source cannot be separated or sound source separation accuracy cannot be secured, an instruction for position control (in other words, an instruction to move to the vicinity of a user who is a sound source) is transmitted to the mobile microphone 50 on the field. Moreover, whether or not prescribed accuracy can be attained may be determined based on information related to the number of microphones or an arrangement of the microphones mounted to each mobile microphone 50.

FIG. 6B is a diagram representing a format of an assistance request according to the third embodiment. In the third embodiment, an ID of a microphone (the mobile microphone 50) to be moved and a movement destination are described. In other words, the assistance request is transmitted by designating a destination. Moreover, the target positional information may be generated based on an image acquired by the camera 43 or generated based on a position of a sound source specified by other means.

According to the third embodiment, since a camera can be arranged at a position providing a downward perspective of an entire field, the number of users can be determined more accurately. In addition, since a microphone to be moved is determined by the interactive apparatus 40 instead of by an autonomous determination by a robot, movement can be performed in a well-planned manner.

(Modifications)

The embodiments described above merely represent examples and the present invention can be implemented with various modifications without departing from the spirit and scope of the invention.

For example, while a position of a sound source is determined by a camera in the description of the embodiments presented above, when a sound source is a robot or the like instead of a person, the sound source itself may notify the position to the robot 10 which is an interaction partner or the interactive apparatus 40.

What is claimed is:

1. A voice acquisition system, comprising:
a plurality of mobile objects each of which includes one or more microphones and is movable around a sound source;
a sound source number estimating unit which estimates the number of sound sources in a vicinity of any of the mobile objects; and
a control unit which controls positions of the mobile objects, wherein the control unit causes, based on the number of sound sources in a vicinity of a first mobile object, a second mobile object that differs from the first mobile object to cooperate with the first mobile object for acquiring voice emitted from the sound sources, wherein the second mobile object is not cooperating with the first mobile object for acquiring voice emitted from the sound sources before the control unit causes the second mobile object to cooperate with the first mobile object, and
the voice acquisition system acquires voice using both a microphone included in the first mobile object and a microphone included in the second mobile object, wherein the voice acquisition system separates sound emitted from a plurality of sound sources according to the sound source using both the microphone included in the first mobile object and the microphone included in the second mobile object.

2. The voice acquisition system according to claim 1, wherein when the number of sound sources present in a vicinity of the first mobile object as estimated by the sound source number estimating unit is larger than a prescribed number, the control unit moves the second mobile object to a vicinity of the first mobile object.

3. The voice acquisition system according to claim 2, wherein the prescribed number is a number of a plurality of sound sources which are present in a vicinity of the first mobile object and which emit sound that cannot be separated at a prescribed accuracy by the number of microphones mounted to the first mobile object.

4. The voice acquisition system according to claim 3, wherein the control unit determines whether or not sound emitted by the plurality of sound sources can be separated at the prescribed accuracy based on information related to the number or an arrangement of the microphones mounted to the first mobile object.

5. The voice acquisition system according to claim 2, wherein the prescribed number is a number larger than the number of microphones mounted to the first mobile object.

6. A mobile object which includes one or more microphones and which is movable around a sound source, the mobile object comprising:
 a sound source number estimating unit which estimates the number of sound sources in a vicinity of the mobile object; a control unit that causes, based on the number of sound sources in a vicinity of the mobile object, another mobile object that differs from the mobile object to move to a vicinity of the mobile object and to cooperate with the mobile object for acquiring voice emitted from the sound sources, wherein the another mobile object is not cooperating with the mobile object for acquiring voice emitted from the sound sources before the control unit causes the another mobile object to cooperate with the mobile object; and
 a voice acquisition unit which acquires voice using both a microphone included in the mobile object itself and a microphone included in the other mobile object, wherein the voice acquisition unit separates sound emitted from a plurality of sound sources according to the sound source using both the microphone included in the first mobile object and the microphone included in the second mobile object.

7. A voice acquisition method of acquiring voice using a plurality of mobile objects each of which includes one or more microphones and is movable around a sound source, the voice acquisition method comprising:
 estimating the number of sound sources in a vicinity of any of the mobile objects;
 controlling, based on the number of sound sources in a vicinity of a first mobile object, a second mobile object which differs from the first mobile object to move to a vicinity of the first mobile object and to cooperate with the first mobile object for acquiring voice emitted from the sound sources, wherein the second mobile object is not cooperating with the first mobile object for acquiring voice emitted from the sound sources before the control unit controls the second mobile object to cooperate with the first mobile object; and
 acquiring voice using both a microphone included in the first mobile object and a microphone included in the second mobile object, wherein the acquiring voice separates sound emitted from a plurality of sound sources according to the sound source using both the microphone included in the first mobile object and the microphone included in the second mobile object.

* * * * *